United States Patent Office 3,052,688
Patented Sept. 4, 1962

3,052,688
PROCESS FOR THE PRODUCTION OF
2-AMINO-OXAZOLES
Viktor Wolf, Hamburg-Hochkamp, and Werner Loop, Hamburg-Lockstedt, Germany, assignors to Nordmark-Werke Gesellschaft mit beschrankter Haftung, Hamburg, Germany
No Drawing. Filed Jan. 13, 1961, Ser. No. 82,392
Claims priority, application Germany Feb. 1, 1960
3 Claims. (Cl. 260—307)

This invention relates to a process for the production of 2-amino-oxazoles which are valuable intermediate products for the production of bacteriostatic agents.

We have found that 2-amino-oxazoles can be obtained in a technically simple manner and with a surprisingly good yield if a member of the group consisting of cyanamide, the mono-alkali metal, the di-alkali metal and the alkaline earth metal salts of cyanamide is reacted with an α-hydroxy-ketone. The new process is operative within a broad range of starting materials and of reaction conditions.

As α-hydroxyketones one may use for instance the products of the general Formula I

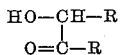

I wherein one R represents a member of the group consisting of the alkyl radicals, the hydroxyalkyl radicals, the benzyl radical and the phenyl radical and the other R is a member of the group consisting of hydrogen, the alkyl radicals, the hydroxyalkyl radicals, the benzyl radical and the phenyl radical.

In this way the 2-amino-oxazoles of the general Formula II are obtained

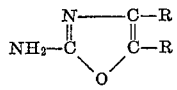

II wherein the two R's have the same meaning as in Formula I.

According to a preferred embodiment of our invention the compounds of the following general Formula III are used as α-hydroxyketones

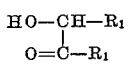

III wherein each of the two $R_1$'s represents a member of the group consisting of the alkyl radicals containing 1–3 carbon atoms and the phenyl radical.

In this case the 2-amino-oxazoles of the general Formula IV are obtained

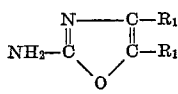

IV wherein $R_1$ has the same meaning as in Formula III.

The reaction may be carried out in an acid, alkaline or neutral medium. If it is desired to work in an acid medium, the addition of acid can be varied within wide limits. For example, it is possible to use that quantity of acid which corresponds stoichiometrically to the introduced metal salt of cyanamide. However, it is also possible to work with a considerable excess of acid, so that for example a 6 N-acid corresponding to a substantially 20% hydrochloric acid is present at the end of the reaction. The conversion is expediently effected in a diluent; water as well as organic solvents miscible with water or mixtures of water and such solvents can be employed successfully as diluent. The reaction is carried out at medium temperatures, advantageously between 0 and 100° C., but it is advisable to effect the reaction at 35–80° C. The molar ratio is preferably about 1:1; however, the desired final products are also obtained when using one starting product in excess. Working up is effected by conventional methods. In view of the instability of some of the 2-amino-oxazoles thus obtained, it is advisable to isolate the 2-amino-oxazoles in such cases in the form of their stable salts with acids.

In one form of our invention which is particularly advantageous from a technical point of view the α-hydroxyketones are prepared in situ, i.e. a product which is a suitable starting material for preparing the α-hydroxyketone in question is reacted to form the α-hydroxyketone, the reaction medium being chosen in such a way that the reaction mixture which is obtained by this step can be used for preparing 2-amino-oxazoles according to the process of our invention without first isolating the α-hydroxyketone in question from the said reaction mixture. In this embodiment of our invention water, organic solvents which are miscible with water and mixtures of water and such solvents are used as reaction medium for the step of preparing the α-hydroxyketones since the following step according to our invention can be easily carried out in such a reaction medium.

One may use for instance as starting material for preparing the α-hydroxyketones the 1.2-diketones of the general Formula V

V wherein the two $R_1$'s have the same meaning as in Formula III, and convert one keto group into the hydroxyl group while using one of the solvents mentioned before. The solvent used for this reaction must not contain groups which are liable of being attacked by hydrogen. Preferably water, alcohols which are miscible with water or mixtures of water and such alcohols are used as reaction medium. The said conversion of one keto group into the hydroxyl group can be carried out by known methods for instance by reacting the 1.2-diketone with hydrogen, preferably with nascent or catalytically stimulated hydrogen such as hydrogen developed from zinc granules and hydrochloric acid, until one keto group of the diketone is converted into the hydroxyl group. Suitable reaction temperatures for the said conversion are 35–80° C. When using diacetyl as starting material and working according to the above given directions solutions of acetoin are obtained which contain good yields of acetoin and can be used directly for preparing 2-amino-4.5-dimethyl-oxazole according to the process of our invention.

Other suitable starting materials for preparing the α-hydroxyketones in situ are the ethinyl carbinols of the general Formula VI

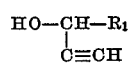

VI wherein $R_1$ represents a member of the group consisting of the alkyl radicals with 1–3 carbon atoms and the phenyl radical.

The α-hydroxyketones are obtainable by adding water according to known methods to the said carbinols while using a reaction medium of the group consisting of water and the mixtures of water and the organic solvents which are miscible with water and maintaining an acid pH-value during this process. The addition of water can be carried out for instance by treating the carbinol in question in an aqueous medium with sulphuric acid and mercury sulphate. A suitable starting material is methyl-ethinyl carbinol which is converted with a very good yield into acetoin when treated in an aqueous medium according to the above described method. Other suitable starting materials are the α-chloro- and α-bromoketones of the general Formula VII

wherein the two $R_1$'s have the same meaning as in Formula III and X stands for a member of the group consisting of chlorine and bromine.

In these compounds the chlorine or bromine atom can be replaced by a hydroxyl group while using as reaction medium water or a mixture of water and an organic solvent which is miscible with water. The reaction is carried out at an elevated temperature, preferably at the boiling point of the reaction medium. The said replacement can be carried out for instance by heating the α-chloro- or α-bromoketone in an aqueous alkaline medium to the boiling point of the said medium. Suitable starting materials are for instance 3-chloro-2-butanone and 3-bromo-2-butanone. The 3-chloro-2-butanone is preferred because its physiological properties are less unpleasant.

The conversion of the said α-hydroxyketones into the 2-amino-oxazoles can be effected simultaneously with the formation of the α-hydroxyketones or subsequent to their formation.

The following examples serve to illustrate our invention.

*Example 1*

71.4 g. of acetoin (methyl-acetyl-carbinol) are added to a solution of 51.1 g. of cyanamide in 150 cc. of water, the mixture being heated while stirring until the acetoin has dissolved. The reaction is exothermic and starts at about 40° C. after the acetoin has dissolved. The temperature is kept between 40 and 45° C. by occasional cooling until the reaction subsides and the solution is thereafter kept overnight at room temperature. The same volume of 10% sodium hydroxide solution is added and thorough extraction is carried out with methylene chloride. The combined methylene chloride extracts are filtered and shaken with a little magnesium sulphate. After evaporating the methylene chloride, the 2-amino-4,5-dimethyl oxazole is left as slightly yellowish crystals with an indefinite melting point between 78 and 91° C. The substance can be purified by vacuum sublimation or by recrystallisation from benzene and then it is obtained as colourless crystals. The substance is unstable and the yield is 86.8% of the theoretical.

*Example 2*

The methylene chloride solution of 2-amino-4,5-dimethyloxazole obtained according to Example 1 is concentrated to 300–500 cc. after having been filtered, and and is dried with magnesium sulphate. Dry hydrogen chloride is then introduced into the solution while cooling and stirring. The hydrochloride of the base crystallises as colourless crystals. Yield: 102.5 g.=85.1%, calculated on the acetoin.

The sustance is sufficiently pure for further processing to, for example, 2-sulpha-4,5-dimethyl-oxazole. It can be recrystallised from isopropanol. The melting point is indefinite in the region of 250° C. with decomposition. The picrate has a M.P.: 216–219° C. with decomposition. In contrast to the free base, the salts of 4,5-dimethyl-2-amino-oxazoles and also their solutions are stable in water or alcohols.

If 42 g. of cyanamide are reacted with 88 g. of acetoin as in Example 1 and the hydrochloride of the base is recovered, then 131.2 g. (=88.5% of the theoretical) of 2-amino-4,5-dimethyl-oxazole hydrochloride are obtained.

*Example 3*

8.8 g. of acetoin and 4.2 g. of cyanamide are boiled under reflux for 6½ hours in 40 cc. of methanol. After evaporating the methanol, the 2-amino-4,5-dimethyl-oxazole crystallises as slightly yellowish crystals. The hydrochloride can be recovered therefrom by dissolving in methylene chloride in accordance with Example 2. Yield=51% of the theoretical.

The 2-amino-4,5-dimethyl-oxazole is also obtained if 8.8 g. of acetoin and 6.4 g. of monosodium cyanamide are boiled under reflux for 1 hour with 40 cc. of methanol, or if 8.8 g. of acetoin and 8.6 g. of disodium cyanamide are boiled under reflux for 30 minutes in 40 cc. of methanol, the mixture is thereafter acidified with hydrochloric acid, the methanol is evaporated, the residue is dissolved in water, the solution is made alkaline and, as described in Example 1, extracted with methylene chloride.

*Example 4*

450 cc. of an aqueous extract of crude calcium cyanamide containing 38.1 g. of calcium cyanamide

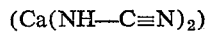

are stirred at a temperature between 40 and 50° C. for 2 hours with 55.0 g. of acetoin. The mixture is thereafter kept overnight at 25° C., filtered off with suction from calcium hydroxide, the calcium being precipitated from the filtrate with sodium carbonate. The pH value is brought to 5 with acid, and the filtrate is then concentrated in vacuo to about 55 cc. 30 g. of sodium hydroxide dissolved in 100 cc. of water are added and exhaustive extraction is then carried out with methylene chloride. 81.2 g. of 2-amino-4,5-dimethyl-oxazole hydrochloride are obtained from the methylene chloride solution in accordance with Example 2.

*Example 5*

55.0 g. of acetoin are added to 100 cc. of an aqueous solution of 26.2 g. cyanamide. 60 cc. of a 36% hydrochloric acid are thereafter added while stirring. The acetoin is dissolved with strong heating. The temperature is kept between 50 and 60° C. by cooling and, after the reaction subsides, the solution is left overnight at 25° C. 110 g. of a 50% sodium hydroxide solution are then added to the solution. The base separating out in crystalline form is taken up in methylene chloride, the separated aqueous solution is saturated with common salt and exhaustively extracted with methylene chloride. From the combined methylene chloride extracts, 84.8 g. of the hydrochloride of 2-amino-4,5-dimethyl-oxazole are obtained according to Example 2.

*Example 6*

A solution of 51 g. of cyanamide in 165 cc. of water is mixed with a solution of 182 g. of phenylacetyl carbinol in 200 cc. of methanol. The mixture is heated to 40–45° C. and 103 cc. of 36% hydrochloric acid are added while stirring, an exothermic reaction taking place. The temperature is kept by occasional cooling between 40 and 45° C. and the mixture is stored overnight at 25° C. after the reaction has been completed. The following day, the methanol is evaporated and the distillation residue is made alkaline with a solution of 57 g. of sodium hydroxide in 100 cc. of water. The mass, which has become thick, is extracted by shaking with methylene chloride. The methylene chloride solution is washed once with water and dried with magnesium sulphate. After concentrating by evaporation, practically colourless crystals of 2-amino-4-methyl-5-phenyl-oxazole with a melting point of 156–160° C. are obtained in the refrigerator. Melting point of the hydrochloride: 238–241° C. with evolution of gas.

*Example 7*

53.5 g. (0.5 mol) of 3-chloro-2-butanone and 50 g. of sodium bicarbonate are mixed with 65 cc. of water while stirring. The mixture is heated to boiling under reflux while stirring for about 6 hours until the evolution of carbon dioxide is completed. The weakly brown mixture is cooled down and 21.0 g. (0.5 mol) of cyanamide, dissolved in 70 cc. of water, are added. The mixture thus obtained is heated to about 40° C. until an exothermic reaction starts. The temperature of the reaction mixture is kept between 40 and 50° C., if necessary by cooling, until the exothermic reaction ceases. Then the reaction mixture is stirred for another 2 hours and extracted exhaustively with methylene chloride. The methylene chloride solution is dried with magnesium sulphate and concentrated to about ½ of its volume. A small quantity of impurities which precipitate is filtered off. Then dry hydrogen chloride is introduced into the solution until the crystalline precipitation is completed. The crystals are filtered off with suction, washed with methylene chloride and recrystallised from ethanol or isopropanol. The hydrochloride of 2-amino-4,5-dimethyl-oxazole is obtained in the form of colourless crystals melting at about 250° C.

*Example 8*

6 g. of 96% sulphuric acid are diluted with 12 cc. of water and, after cooling, 300 cc. of methanol are added (solution I).

39.6 g. of phenyl-ethinyl carbinol are dissolved in 300 cc. of methanol (solution II).

Solution I is heated with 6 g. of mercury sulphate in a 1-litre three-necked flask provided with a stirrer, reflux condenser, dropping funnel and thermometer and while stirring to 55–60° C. Half of solution II is then introduced into the mixture while stirring vigorously at 55–60° C., the introduction being made dropwise within one hour from the dropping funnel. Another 3 g. of mercury sulphate are added and thereafter the second half of solution II is introduced within another hour under the same conditions. 3 g. of fresh mercury sulphate and 30 cc. of water are now introduced into the mixture, which is stirred for another 2 hours at 55–60° C. After cooling, the mixture is made weakly alkaline with sodium hydroxide solution and filtered. The filtrate is concentrated to 200 cc. A solution of 12.6 g. of cyanamide in 33 cc. of water is added at 40–45° C. while stirring and acidification is effected with 25 cc. of 36% hydrochloric acid. The mixture is stirred for 1 hour at a temperature between 40 and 60° C., the methanol is evaporated, the distillation residue is made strongly alkaline, it is thoroughly extracted by shaking with methylene chloride, the methylene chloride solution is washed with water and thereafter it is dried with magnesium sulphate. By concentrating the methylene chloride solution by evaporation, the 2-amino-4-methyl-5-phenyl-oxazole is obtained in the form of flakes with a melting point of 155–158° C.

*Example 9*

200 cc. of 10% hydrochloric acid at a temperature of 60° C. are poured over 50 g. of zinc granules placed in a three-necked flask provided with a stirrer device, reflux condenser, dropping funnel and thermometer. 21.5 g. (¼ mol) of diacetyl are introduced into the dropping funnel and each ¼ of the diacetyl is added within 5 minutes at 60° C. and while stirring well to the hydrochloric acid. After completing the addition, stirring is continued for another 5 minutes and the solution obtained is decanted off from the zinc, the solution thus obtained is cooled down to 40° C. At this temperature a solution of 4.2 g. of cyanamide in 40 cc. of water is added. The temperature of the reaction mixture is kept between 40 and 50° C. by cooling. After the exothermic reaction is finished the reaction mixture is allowed to stand for about 12 hours at room temperature. Then so much soda lye is added to the reaction mixture that the zinc hydroxide which precipitates at first is dissolved again. The mixture is extracted exhaustively with methylene chloride. The methylene chloride solution is dried with magnesium sulphate and concentrated to about ½ of its volume. A small quantity of impurities is filtered off. The 2-amino-4,5-dimethyl-oxazole is precipitated as hydrochloride by introducing dry hydrogen chloride in accordance with Example 2.

What we claim is:

1. A process for the production of 2-amino-oxazoles which comprises reacting a member selected from the group consisting of cyanamide, the monoalkali metal, the dialkali metal and the alkaline earth metal salts of cyanamide with a α-hydroxyketone of the Formula I

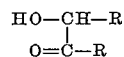

wherein one R is a member selected from the group consisting of alkyl with 1 to 3 carbon atoms and phenyl and the other R is a member selected from the group consisting of hydrogen, alkyl with 1 to 3 carbon atoms and phenyl, and isolating the 2-amino-oxazole thus obtained.

2. A process as claimed in claim 1 wherein the reaction is carried out in the presence of a reaction medium selected from the group consisting of water, the lower alkanols miscible with water, and mixtures thereof and at a temperature between 35 and 80° C.

3. A process as claimed in claim 1 wherein the α-hydroxyketone is acetoin.

References Cited in the file of this patent
UNITED STATES PATENTS 2,186,894 Broderson et al. _____ Jan. 9, 1940
2,362,337 Anderson _____ Nov. 7, 1944

OTHER REFERENCES

Fromn et al.: Liebigs Ann., vol. 442, p. 130 (1925).
Fromn et al.: Liebigs Ann., vol. 447, p. 259 (1926).
Backer et al.: Chem. Abstracts, vol. 38, col. 2327 (1944).
Badger et al.: Chem. Abstracts, vol. 51, col. 13849 (1957).
Elderfield: "Heterocyclic Comp'ds." vol. 5, p. 385 (1957).
Maeda: Chem. Abstracts, vol. 52, col. 11007 (1958).
Goldberg et al.: Chem. Abstracts, vol. 53, col. 16953 (1959).